(12) United States Patent
Satou et al.

(10) Patent No.: US 11,023,003 B2
(45) Date of Patent: Jun. 1, 2021

(54) HEAD MOUNTED DISPLAY

(71) Applicant: HITACHI-LG DATA STORAGE, INC., Tokyo (JP)

(72) Inventors: Yoshihiro Satou, Tokyo (JP); Kenji Kiya, Tokyo (JP); Kazuhiko Kuzumaki, Tokyo (JP); Tatsuya Ishitobi, Tokyo (JP); Katsuhiko Kimura, Tokyo (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 13 days.

(21) Appl. No.: 16/361,708

(22) Filed: Mar. 22, 2019

(65) Prior Publication Data

US 2019/0332142 A1    Oct. 31, 2019

(51) Int. Cl.
*G06F 1/16*    (2006.01)
*G06F 3/01*    (2006.01)

(52) U.S. Cl.
CPC .............. *G06F 1/163* (2013.01); *G06F 3/011* (2013.01); *G06F 3/012* (2013.01)

(58) Field of Classification Search
CPC ............ G02B 27/0172; G02B 27/0176; G02B 2027/017; G02B 2027/0178; G06F 3/011; G06F 3/012; G06F 1/163
See application file for complete search history.

(56) References Cited

U.S. PATENT DOCUMENTS

2004/0252077 A1*  12/2004  Terasaki ............. G02B 27/0176
                                                                  345/8
2007/0115478 A1*  5/2007  Ray .................... G01B 9/02067
                                                                  356/487
2011/0050655 A1*  3/2011  Mukawa ............. G02B 6/0018
                                                                  345/204
2012/0044502 A1*  2/2012  Diehl ................. G01B 11/0675
                                                                  356/511
2012/0206816 A1*  8/2012  Yoshida ............. G02B 27/0172
                                                                  359/630
2013/0278497 A1*  10/2013  Takagi .................... G06F 3/012
                                                                  345/156
2015/0146753 A1*  5/2015  Ikegami ............. H01S 5/02248
                                                                  372/38.07
2015/0338662 A1*  11/2015  Tsuruyama ............. G06F 3/013
                                                                  348/744
2017/0237935 A1*  8/2017  Totani .................... G03B 21/16
                                                                  348/802
2018/0322708 A1*  11/2018  Luccin ............... G02B 27/0172
2019/0332142 A1*  10/2019  Satou .................... G06F 1/1639

FOREIGN PATENT DOCUMENTS

JP    2014-186201 A    10/2014
JP    2015-220666 A    12/2015

* cited by examiner

*Primary Examiner* — Vijay Shankar
*Assistant Examiner* — Nathaniel P Brittingham
(74) *Attorney, Agent, or Firm* — Volpe Koenig

(57) ABSTRACT

A head mounted display includes a first optical housing mounting a light source and an optical component, a second optical housing mounting an image generating element and an optical component, a securing member connecting and securing the first optical housing and the second optical housing, and an exterior housing holding the first optical housing, the second optical housing, and the securing member. The securing member is fitted with the first optical housing with the second optical housing enclosed to connect and secure the first optical housing and the second optical housing.

6 Claims, 5 Drawing Sheets

HEAD MOUNTED DISPLAY

CLAIM OF PRIORITY

The present application claims priority from Japanese patent application serial No. JP 2018-083977, filed on Apr. 25, 2018, the content of which is hereby incorporated by reference into this application.

BACKGROUND OF THE INVENTION

1. Field of the Invention

The present invention relates to a head mounted display and specifically relates to a structure for securing an optical component.

2. Description of the Related Art

A head mounted display (HMD) is a device mounted on a head of a user to project an image on his/her eyes and provide information. There are several types of how to mount the device on the head, such as a helmet type and a glasses type. In consideration of convenience and convention, the glasses type prevails. Also, there are several ways to provide image information, such as virtual reality providing a virtual space, which is different from an actual field of view, and augmented reality projecting image information on an actual field of view. The virtual reality is applicable to games, simulation training, and the like while the augmented reality is applicable to a scene in which an explanatory guide is overlaid on an actual field of view, and the like.

Since a still image and a moving image are used in these techniques, optical characteristics from the light source to the eyes of the user have a large effect on the quality. An example of an item influencing the optical characteristics is optical axis shift from the light source to the eyes. In a case in which the optical axis shifts, the quality of the image that the user watches may be lowered, the displayed image and letters may be distorted, and color non-uniformity and brightness non-uniformity may be generated on the displayed image.

As a technique in relation to this, in a glasses-type HMD described in JP 2015-220666 A, proposed is a configuration in which relative arrangement between a projection unit provided on a temple unit and projecting image information and a reflection unit provided on a glasses lens unit is variable, and in which positions at which images are displayed are adjustable in accordance with positions of user's eyes.

Also, in a glasses-type HMD described in JP 2014-186201 A, proposed is a configuration in which an image element case housing an image display element and a lens barrel housing a projection lens are adhesively attached to each other while a relative position between the image display element and the projection lens is adjusted.

SUMMARY OF THE INVENTION

In the configuration described in JP 2015-220666 A, the optical characteristics can be optimized at the time of adjustment. However, since the projection unit is provided on the temple unit of the glasses, the temple unit may be flexed when the HMD is actually mounted on the head. As a result, the positional relationship between the projection unit and the reflection unit may change, and the display position with respect to the user's eye may eventually be displaced.

In the configuration described in JP 2014-186201 A, the image element case housing the image display element and the lens barrel housing the projection lens are adhesively attached by filling a gap therebetween serving as an adjustable range with adhesive and solidifying the adhesive. In this configuration, in a case in which the positions of the image element case and the lens barrel after adjustment are inclined, the thickness of the filled adhesive will differ depending on the point. As a result, when the HMD falls down, the image element case (image display element) and the lens barrel (projection lens) may be detached from each other due to insufficient adhesion strength.

In general, in adjustment of an optical system of the HMD or the like, a screw, adhesive, or the like is used to secure respective components after adjustment. In a case of the screw, positional displacement (rotation) may occur at the time of tightening. Also, when the use environment of the HMD is considered, securing the components by means of adhesive causes a problem in reliability such as insufficient strength at the time of falling and aged deterioration.

In consideration of the above problems, an object of the present invention is to provide a head mounted display enabling a position of an optical axis to be adjusted easily and enabling a state after adjustment to be maintained in a stable manner.

To solve the above problems, a head mounted display includes a first optical housing mounting a light source and an optical component, a second optical housing mounting an image generating element and an optical component, a securing member connecting and securing the first optical housing and the second optical housing, and an exterior housing holding the first optical housing, the second optical housing, and the securing member. The securing member is fitted with the first optical housing with the second optical housing enclosed to connect and secure the first optical housing and the second optical housing. A securing direction by means of the securing member is a direction of an optical axis when a beam from the light source is emitted from the first optical housing and enters the second optical housing mounting the image generating element.

According to the present invention, it is possible to provide a head mounted display facilitating adjustment of an optical axis and an assembling operation, restricting lowering of the quality of a displayed image, and having high reliability.

DESCRIPTION OF THE PREFERRED EMBODIMENTS

Hereinbelow, embodiments of a head mounted display (hereinbelow abbreviated as an HMD) according to the present invention will be described with reference to the drawings.

First Embodiment

Figure 1:
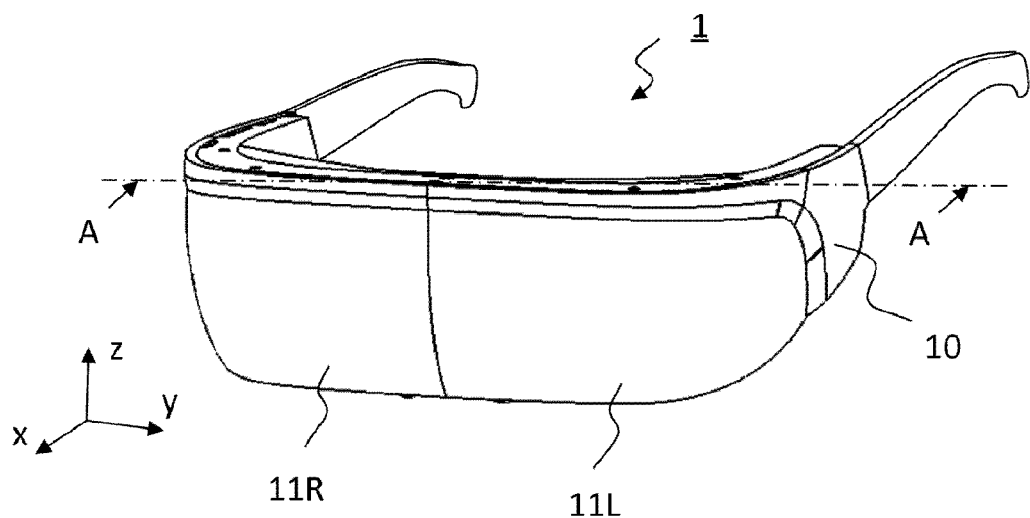
FIG. 1 is an external view of an HMD according to a first embodiment.

FIG. 1 is an external view of an HMD according to an embodiment. In this embodiment, a glasses-type HMD 1 is illustrated as an example and is mounted on a head of a user. An optical system (HMD main body) generating and projecting an image is held in an exterior housing 10 of the HMD 1. Shields 11R and 11L are adapted to protect the HMD main body and are made of a permeable material enabling a view to be taken in. This enables the user to visually recognize an image of virtual reality, augmented reality, or the like. Meanwhile, as for coordinates in the following description, when the user equipped with the HMD 1 stands up straight, a front face direction is defined as an x direction, a direction along the right and left ears is defined as a y direction, and a perpendicular direction is defined as a z direction.

Figure 2:
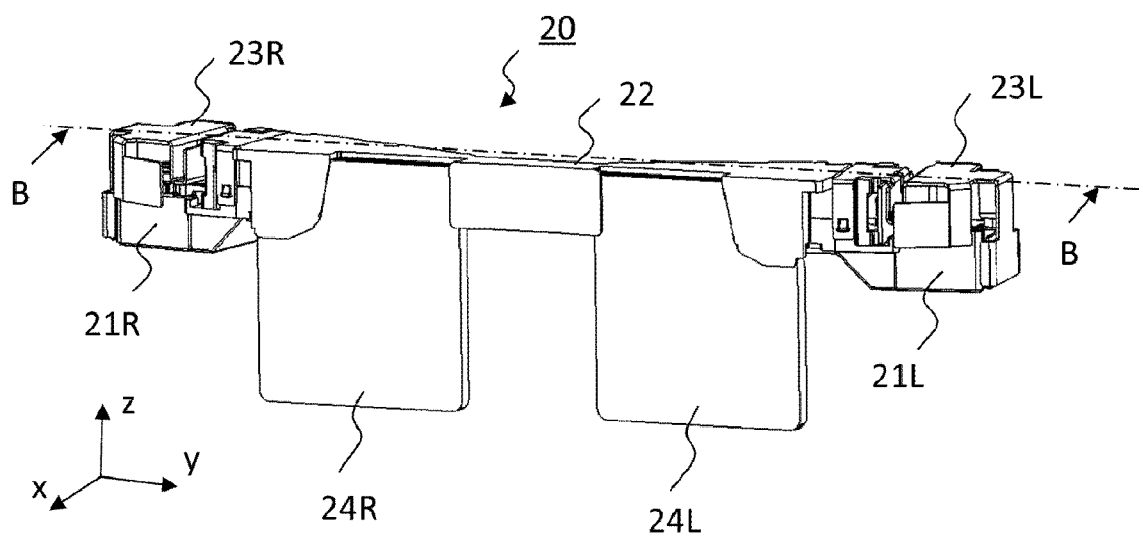
FIG. 2 illustrates a configuration of an HMD main body in a state in which an exterior housing is detached.

FIG. 2 illustrates a configuration of an HMD main body 20 in a state in which the exterior housing 10 is detached. The HMD main body 20 includes right and left first optical housings 21R and 21L, a second optical housing 22, securing members 23R and 23L securing the right and left first optical housings 21R and 21L and the second optical housing 22, and image display units 24R and 24L displaying images in front of the user's eyes. The HMD main body 20 also includes a not-illustrated substrate performing image processing and a not-illustrated power supply. As described below, the first optical housings 21R and 21L are provided with light sources and optical components, and the second optical housing 22 is provided with image generating elements and optical components.

Figure 3:
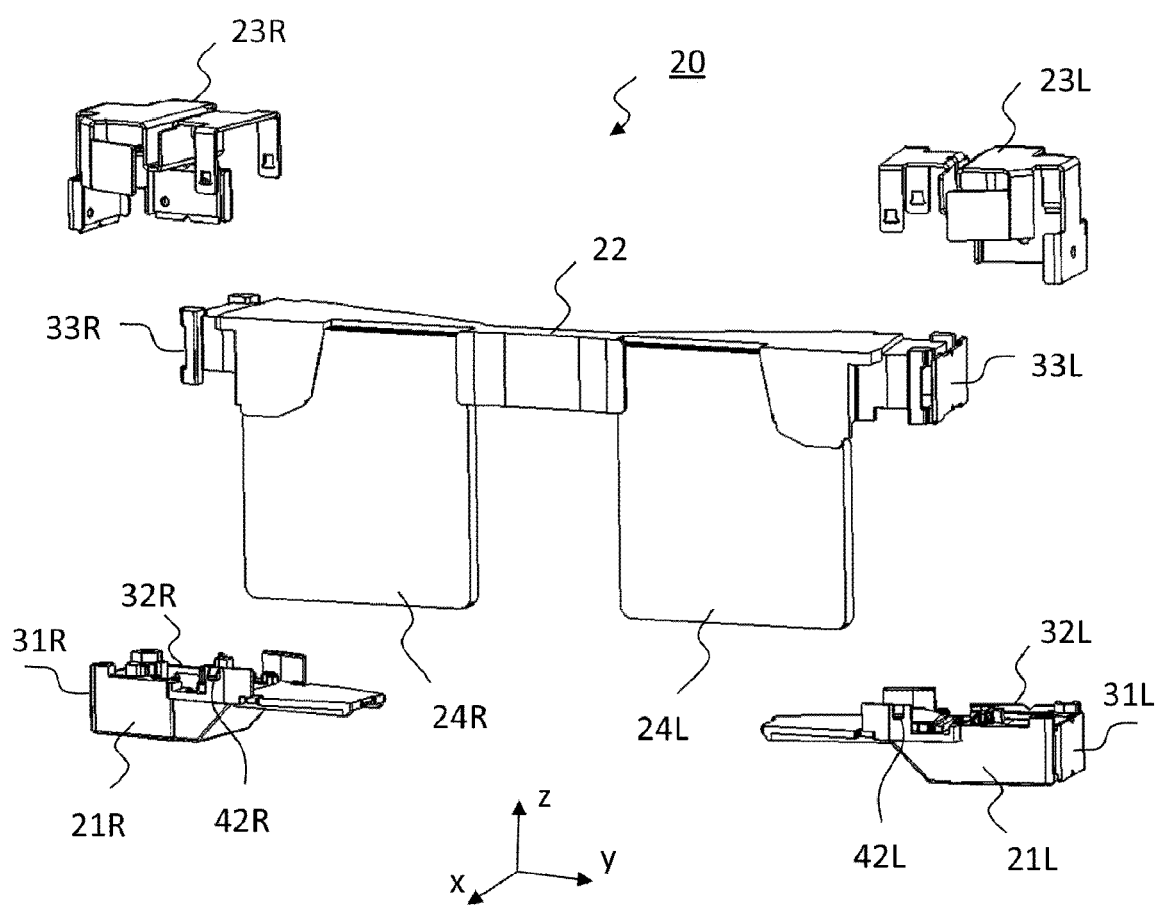
FIG. 3 is an exploded view of the HMD main body into optical housings and securing members.

FIG. 3 is an exploded view of the HMD main body 20 into the optical housings and the securing members and illustrates a positional relationship among the first optical housings 21R and 21L, the second optical housing 22, and the securing members 23R and 23L in FIG. 2. The HMD main body 20 has a configuration in which, after the first optical housings 21R and 21L are adjusted in terms of the positions thereof with respect to the second optical housing 22, the first optical housings 21R and 21L and the second optical housing 22 are connected and secured by the securing members 23R and 23L. The first optical housings 21R and 21L are provided with light sources 31R, 32R, 31L, and 32L, and the second optical housing 22 is provided with image generating elements 33R and 33L. Projections 42R and 42L provided on the side surfaces of the first optical housings 21R and 21L are adapted to fit the first optical housings 21R and 21L with the securing members 23R and 23L.

In the HMD 1 according to the present embodiment, the image generating elements 33R and 33L generating images and the image display units 24R and 24L displaying images are integrally formed. For this reason, even in a case in which the temple units of the glasses are flexed when the HMD 1 is mounted on the head, the positional relationship among the image generating elements 33R and 33L and the image display units 24R and 24L will hardly change, and the positions of the images that the user watches will not be displaced.

Also, the first optical housings 21R and 21L provided with the light sources 31R, 32R, 31L, and 32L and the second optical housing 22 provided with the image generating elements 33R and 33L are connected and secured not by adhesive but by fitting with use of the securing members 23R and 23L. For this reason, when the HMD falls down, the two optical housings will not be detached from each other due to insufficient adhesion strength.

Hereinbelow, a structure and an assembling method of the HMD according to the present embodiment will be described in detail.

Figure 4A:
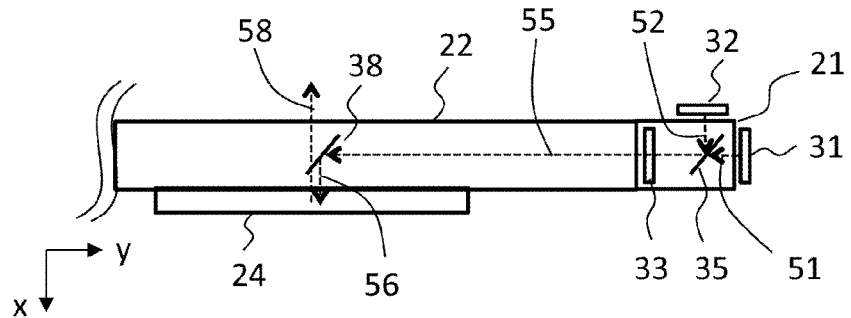
FIG. 4A is an upper view illustrating an optical system of the HMD main body.
Figure 4B:
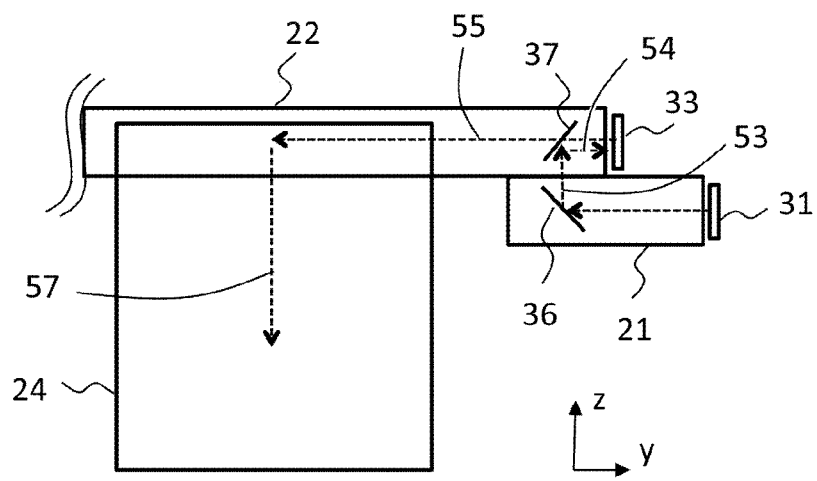
FIG. 4B is a front view illustrating the optical system of the HMD main body.
Figure 4C:
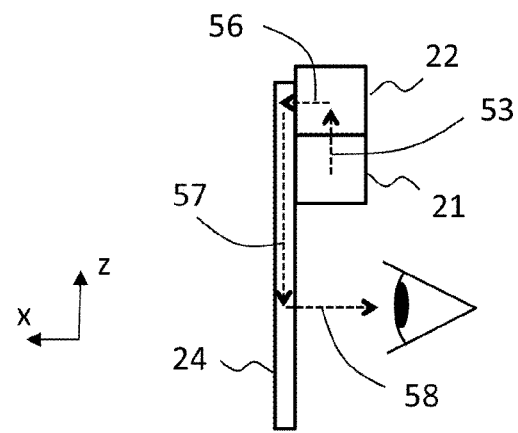
FIG. 4C is a side view illustrating the optical system of the HMD main body.

FIGS. 4A, 4B, and 4C illustrate the optical system of the HMD main body 20 and illustrate an upper view (xy plane), a front view (yz plane), and a side view (xz plane), respectively. Meanwhile, as illustrated in FIGS. 2 and 3, since the HMD main body 20 is symmetric, a structure of one side (left eye side) will be described. Also, in the below description of respective components including illustration of the components in the drawings, the symbols R and L, which distinguish between the right side and the left side, are removed. For example, the first optical housing 21L on the left eye side is simply referred to as the first optical housing 21.

In order for the HMD 1 according to the present embodiment to display a full-color image, the first optical housing 21 includes light sources of three primary colors, which are the two light sources 31 and 32. For example, the light source 31 is a light source of a green color, and the light source 32 is a light source of red and blue colors. As illustrated in FIG. 4A, beams 51 and 52 generated from the light sources 31 and 32 are multiplexed at an optical component 35 such as a beam multiplexing prism and a half mirror. A multiplexed beam 53 is thereafter reflected on an optical component 36, turns in the z direction, and heads for the second optical housing 22, as illustrated in FIG. 4B.

The second optical housing 22 includes the image generating element 33 and is arranged to be piled on the first optical housing 21 in the z direction. The beam 53 incident from the first optical housing 21 turns in the y direction by means of an optical component 37 such as a prism provided at a beam entrance portion of the second optical housing 22 and is emitted to the image generating element 33 as a beam 54. The image generating element 33 is a liquid crystal element or the like and provides the beam 54 with image information. A beam 55 provided with the image information passes through the optical component 37, propagates through the second optical housing 22, and heads for the image display unit 24. Subsequently, as illustrated in FIG. 4A, the beam 55 turns in the x direction by means of an optical component 38 provided in the second optical housing 22 and enters the image display unit 24 as a beam 56.

The image display unit 24 includes a not-illustrated diffraction grating and is mounted on a lower side in the z axis and on a front side in the x axis of the second optical housing 22. As illustrated in FIGS. 4B and 4C, the beam 56 incident into the image display unit 24 is converted into a beam 57 guided in the −z direction in the yz plane. Subsequently, the beam 57 guided to the front of the user's eye turns into a beam 58 diffracted to the eye direction (x axis) by the diffraction grating, is emitted outside the plane of the image display unit 24, and enters the user's eye. Through the above beam stream, the HMD 1 displays an image in the direction of the user's field of view.

As described above, the HMD 1 according to the present embodiment has a configuration in which the beam path is separated into the beam paths on the near and far sides of the image generating element 33 by the two structures, that is, the first optical housing 21 and the second optical housing 22. As for the positional relationship between the structures, the structures are arranged as close to the user's face as possible to prevent the structures from being detached easily in a state in which the user is equipped with the HMD 1. To do so, the first optical housing 21 and the second optical housing 22 are arranged to be piled in the z direction, and the optical component 36 turning the y-direction beam into the z direction is provided at a beam outlet of the first optical housing 21.

Also, the first optical housing 21 is arranged so that the position of the end thereof may be displaced in the y direction from the second optical housing 22. The reason for this is to reserve over the first optical housing 21 a space to house an electronic substrate driving the light sources 31 and 32. In this manner, in the present embodiment, since the first optical housing 21 and the second optical housing 22 are separated, the first optical housing 21 and the second optical housing 22 need to be positioned so that the beam paths (optical axes) of the first optical housing 21 and the second optical housing 22 may correspond. Hence, a configuration in which the first optical housing 21 and the second optical housing 22 are secured with use of the securing member 23 described below is employed.

Figure 5:
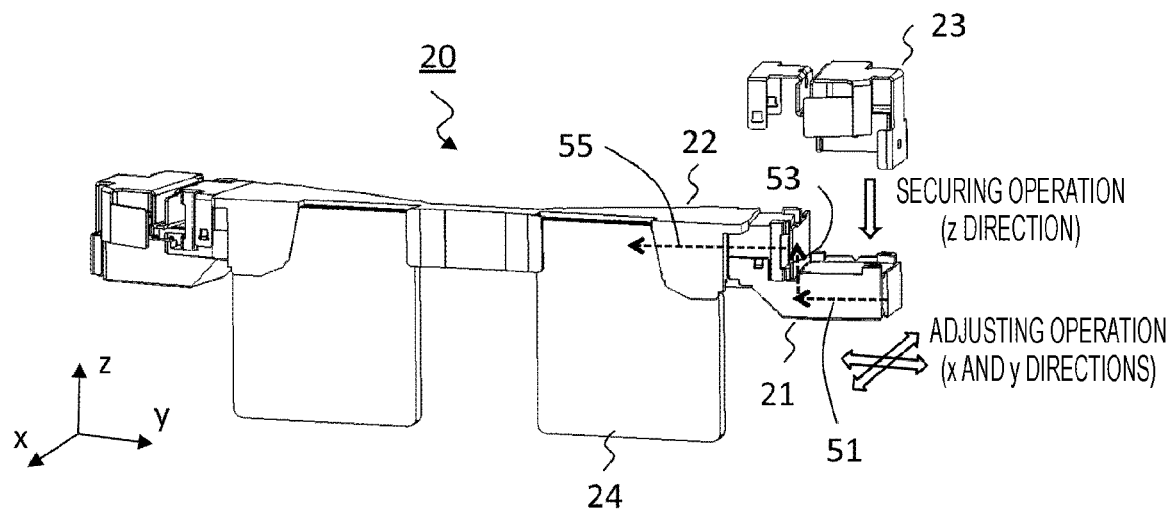
FIG. 5 illustrates how to position and secure two optical housings.

FIG. 5 illustrates how to position and secure the first optical housing 21 and the second optical housing 22. First, as illustrated in FIGS. 4A and 4B, the light sources 31 and 32 and the optical components 35 and 36 are positioned and mounted on the first optical housing 21. On the other hand, as illustrated in FIGS. 4A and 4B, the image generating element 33, the optical components 37 and 38, and the image display unit 24 are positioned and mounted on the second optical housing 22.

In the first optical housing 21 and the second optical housing 22 assembled as sub-assemblies, positional adjustment of the optical axes is performed to form the entire optical system, and the first optical housing 21 is mounted on the second optical housing 22. This adjustment is adjustment of the positional relationship among the light sources 31 and 32 mounted on the first optical housing 21 and the image generating element 33 mounted on the second optical housing 22 and is performed to cause the beam 54 from the light sources 31 and 32 to enter the image generating element 33 at the correct position in FIG. 4B. Due to this adjustment, optical axis shift from the light sources to the user's eye can be prevented, and distortion, color non-uniformity, and brightness non-uniformity of the displayed image can be prevented.

In this configuration, the separation plane of the optical housings is between the optical component 36 serving as a beam emitting portion of the first optical housing 21 and the optical component 37 serving as a beam entering portion of the second optical housing 22 and is a plane (xy plane) perpendicular to the axial direction (z direction) of the beam 53. Hence, directions for adjustment between the optical housings are directions (x and y directions) perpendicular to the optical axis of the beam 53 as illustrated in FIG. 5, and adjustment of the optical axis shift is easy. Temporary securement of the optical housings by means of adhesion or the like after adjustment leads to favorable operability.

Subsequently, in a state in which the first optical housing 21 and the second optical housing 22 are temporarily secured, the securing member 23 is secured to the first optical housing 21 to enclose the second optical housing 22. At this time, a direction of mounting and securing the securing member 23 is a normal direction to the separation plane (adjustment plane) of the two optical housings, that is, the z direction, as illustrated in FIG. 5. Hence, at the time of the securing operation by means of the securing member 23, no unnecessary force will be applied in the optical axis adjustment directions (x and y directions), and the adjusted optical axes will not be shifted. In this manner, the first optical housing 21 and the second optical housing 22 can be secured in a state in which the optical axis of the beam 51 in the first optical housing 21 and the optical axis of the beam 53 in the second optical housing 22 correspond.

Figure 6:
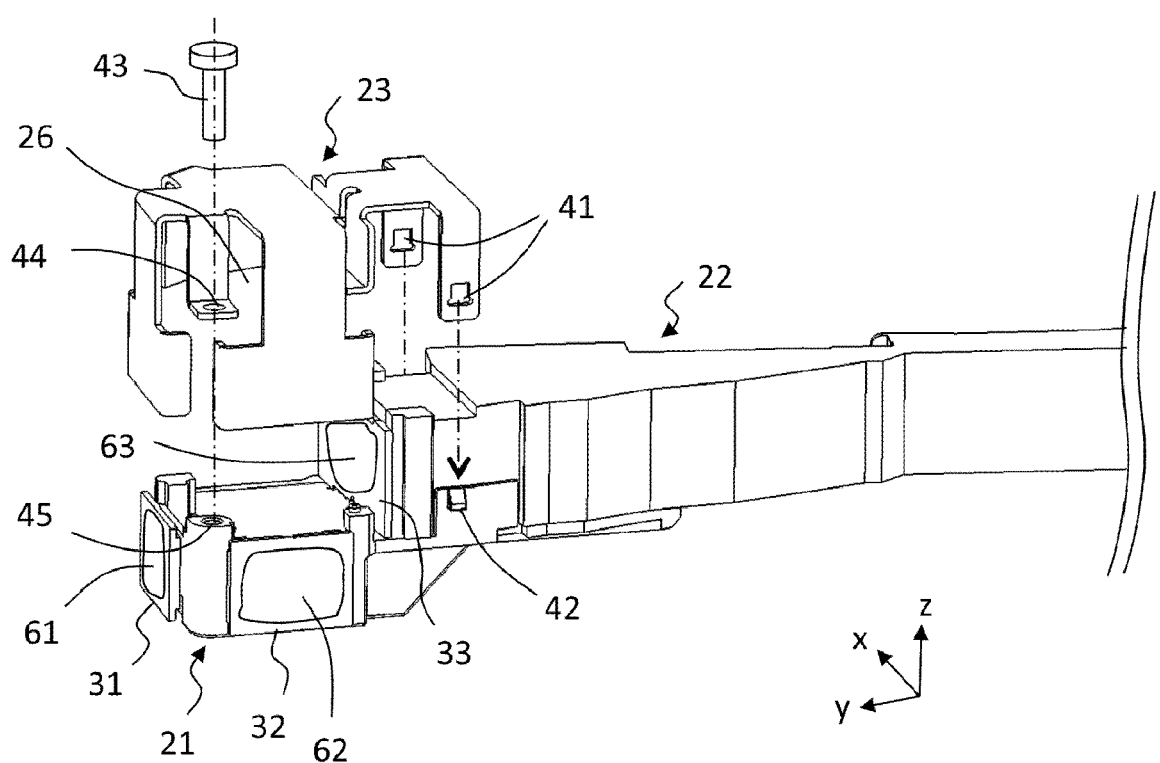
FIG. 6 describes a shape and a securing method of a securing member in detail.

FIG. 6 describes the shape and the securing method of the securing member 23 in detail. The basic shape of the securing member 23 is a shape of covering the back surfaces of the light sources 31 and 32 mounted on the first optical housing 21 and the back surface of the image generating element 33 mounted on the second optical housing 22.

Specifically, the light sources 31 and 32 are located at the terminals of the securing member 23, and the securing member 23 is formed to be parallel to the back surfaces of the light sources 31 and 32. The inside diameters of the securing member 23 in the x and y directions correspond to the outside diameters of the first optical housing 21, and the inside diameter of the securing member 23 in the z direction corresponds to the outside diameter of the second optical housing 22. Hence, the securing member 23 contacts the side surfaces of the first optical housing 21 but does not contact the side surfaces of the second optical housing 22, and the adjusted optical axes will not be shifted.

Also, to reserve the space to house the not-illustrated electronic substrate close to the image generating element 33, the securing member 23 is formed in a U shape to cover the back surface of the image generating element 33 in parallel. Further, as for the shape of the securing member 23 from the light sources 31 and 32 to the image generating element 33, a space 26 to house and protect the electronic substrate on the upper surface of the first optical housing 21 is formed. This exerts an effect of preventing the user's hand from accidentally touching the light sources 31 and 32 and the image generating element 33 after assembling.

Next, the securing method by means of the securing member will be described in detail. At least three connecting portions between the securing member 23 and the first optical housing 21 are provided. The side surfaces of the securing member 23 are provided with two fitting holes 41, the side surfaces of the first optical housing 21 are provided with the two projections 42, and the securing member 23 and the first optical housing 21 are fitted with each other at two portions. Also, a securing screw 43 passes through a screw hole 44 of the securing member 23 and is screwed shut at one portion into a screw securing unit 45 of the first optical housing 21.

The basic securing operation between the first optical housing 21 and the second optical housing 22 is dealt with by fitting between the two fitting holes 41 of the securing member 23 and the two projections 42 of the first optical housing 21. Since the securing direction by the fitting is the normal direction (z direction) to the separation plane (adjustment plane) of the first optical housing 21 and the second optical housing 22, no force will be applied in the optical axis adjustment directions (x and y directions) at the time of the securing operation. Also, even in a case in which the secured assembly falls down, the optical housings can be prevented from being detached.

Next, the securing operation by means of the securing screw 43 is performed to connect and secure the first optical housing 21 to the securing member 23 and plays a role of stabilizing the posture of the securing member 23. Thus, tightening will not cause the positions of the optical axes adjusted between the first optical housing 21 and the second optical housing 22 to fluctuate. Also, as for the screwing location, the first optical housing 21 and the not-illustrated electronic substrate or the like can be secured together with the electronic substrate enclosed, and the operation can be simplified. In addition, the not-illustrated electronic substrate is housed in the space 26 surrounded by the securing member 23 and the first optical housing 21 secured in the above manner. Further, by interposing a not-illustrated elastic body between the securing member 23 and the second optical housing 22, the first optical housing 21 and the second optical housing 22 can be secured more firmly.

Here, characteristics of the securing method by means of the securing member 23 in the HMD according to the present embodiment will be summarized. The securing member 23 basically employs a method of hanging on the projections 42 of the first optical housing 21 with the second optical housing 22 enclosed therein for fitting and securing. Accordingly, at the time of the securing operation by means of the securing member 23, the adjusted optical axes will not be shifted, the assembling accuracy is improved, and the operability is improved. In addition, even when the assembled HMD falls down, the first optical housing 21 will hardly be detached from the second optical housing 22, and the reliability is improved.

Second Embodiment

A second embodiment relates to improvement of heat dissipating characteristics in the HMD 1 described in the first embodiment. The HMD main body 20 includes heat generating units such as the light sources 31 and 32 and the image generating element 33. Hence, by effectively dissipating heat generated from these units out of the exterior housing 10, a temperature increase of the optical housings is restricted, and the optical axis shift and lowering of the image quality along with the temperature increase is restricted.

In FIG. 3 described above, heat dissipating materials are arranged between the light sources 31R, 32R, 31L, and 32L mounted on the first optical housings 21R and 21L and the securing members 23R and 23L, and between the image generating elements 33R and 33L mounted on the second optical housing 22 and the securing members 23R and 23L. Heat dissipating materials are also arranged between the securing members 23R and 23L and the exterior housing 10.

Specifically, in FIG. 6 described above, heat dissipating materials 61, 62, and 63 are attached to the light sources 31 and 32 and the image generating element 33, which are heat generating units. The heat dissipating materials are made of a material having a high heat-transfer effect such as a moisture-curable heat dissipating resin and a clad material. Meanwhile, the heat dissipating materials are preferably made of a softer material than the material for the housings not to cause displacement of the surrounding optical components.

Figure 7:
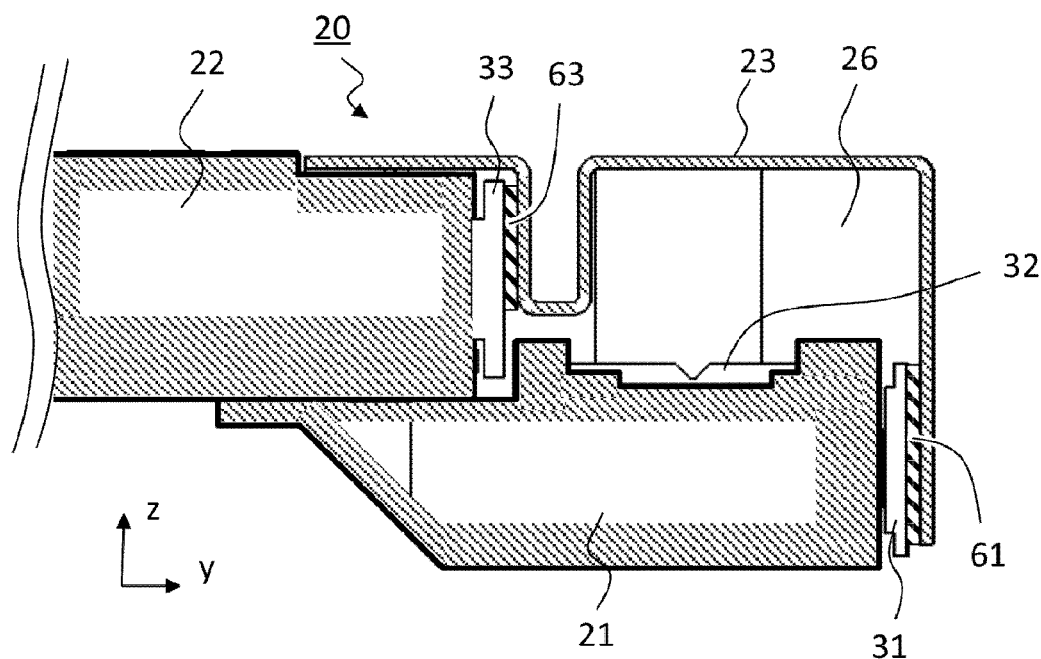
FIG. 7 illustrates positions and structures of heat dissipating materials in a state in which the securing member is provided (second embodiment)

FIG. 7 illustrates positions and structures of the heat dissipating materials in a state in which the securing member is provided and is a cross-sectional view along the position B-B in FIG. 2. In a state in which the first optical housing 21 and the second optical housing 22 are sub-assemblies, the heat dissipating materials 61, 62, and 63 are attached and secured to the light sources 31 and 32 and the image generating element 33 in advance. At this time, the shapes (thicknesses) of the respective heat dissipating materials are defined so that the heat dissipating materials 61, 62, and 63 may contact the securing member 23 in a state in which the securing member 23 is provided. Thus, heat dissipating paths are formed from the light sources 31 and 32 and the image generating element 33 to the securing member 23. The HMD main body 20 assembled in this manner is mounted in the exterior housing 10.

Figure 8:
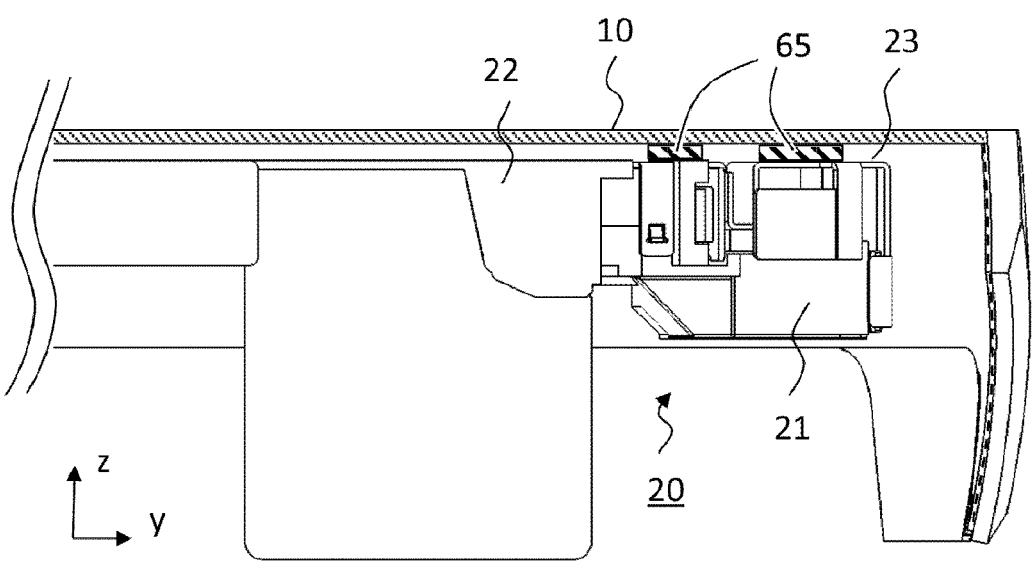
FIG. 8 illustrates positions and structures of heat dissipating materials in a state in which the HMD main body is mounted in the exterior housing.

FIG. 8 illustrates positions and structures of the heat dissipating materials in a state in which the HMD main body 20 is mounted in the exterior housing 10 and is a cross-sectional view along the position A-A in FIG. 1. In a similar manner to that in FIG. 7, heat dissipating materials 65 are arranged between the exterior housing 10 and the securing member 23 of the HMD main body 20. Thus, heat from the HMD main body 20 is transferred via the securing member 23 serving as a heat-transfer member to the exterior housing 10 and is dissipated to the air. Accordingly, heat generated in the light sources 31 and 32 and the image generating element 33 can be dissipated via the exterior housing 10 to the air.

According to the present embodiment, a temperature increase of the optical housings of the HMD can be restricted, and the optical axis shift and lowering of the image quality along with the temperature increase can be restricted. Consequently, the highly reliable HMD can be provided.

Although the structure and the assembling method of the HMD on the left eye side have been described in the above embodiments, the same is true of the right eye side. As one of the characteristics of the HMD according to the present embodiments, the optical systems on the right and left sides are respectively independent. This enables the characteristic errors of the right and left optical systems, light sources, and image generating elements to be adjusted independently, which brings about an effect of maximizing the quality.

What is claimed is:

1. A head mounted display emitting a beam from a light source to an image generating element and displaying a generated image in a direction of a user's field of view, the head mounted display comprising:

a first optical housing mounting the light source and an optical component, the light source including a back surface;

a second optical housing mounting the image generating element and an optical component, wherein the first optical housing and the second optical housing are positionally adjusted with respect to each other within an xy plane to achieve favorable operability, the image generating element including a back surface;

a securing member which applies a restraining force in a direction approximately normal to the xy plane connecting and securing the positionally adjusted first optical housing and the second optical housing; and an exterior housing holding the first optical housing, the second optical housing, and the securing member, wherein the securing member is fitted with the first optical housing with the second optical housing enclosed to connect and secure the first optical housing and the second optical housing, the securing member including an inside diameter extending in x and y directions along the xy plane that corresponds to an outside diameter of the first optical housing, and including an inside diameter extending in a z direction normal to the xy plane that corresponds to an outside diameter of the second optical housing, the securing member shaped to cover the back surfaces of the light source and the image generating element.

2. The head mounted display according to claim 1, wherein the first optical housing and the second optical housing are arranged to be piled vertically in the direction normal to the xy plane when the user equipped with the head mounted display stands up straight.

3. The head mounted display according to claim 1, wherein the securing member is provided with a fitting hole and wherein the first optical housing is provided with a projection arranged to extend within the fitting hole for fitting the securing member to the first optical housing.

4. The head mounted display according to claim 3, wherein the securing member and the first optical housing are secured in the direction normal to the xy plane by a securing screw.

5. The head mounted display according to claim 1, wherein heat dissipating materials are respectively arranged between the securing member and the light source mounted on the first optical housing, and between the securing member and the image generating element mounted on the second optical housing.

6. The head mounted display according to claim 5, wherein a heat dissipating material is arranged between the securing member and the exterior housing.

\* \* \* \* \*